(12) United States Patent
De Samber et al.

(10) Patent No.: US 9,585,205 B2
(45) Date of Patent: Feb. 28, 2017

(54) WET PROCESSED ELECTRONIC SYSTEMS

(71) Applicant: PHILIPS LIGHTING HOLDING B.V., Eindhoven (NL)

(72) Inventors: Marc Andre De Samber, Eindhoven (NL); Antonius Wilhelmus Maria De Laat, Eindhoven (NL); Esther Anna Wilhelminia Gerarda Janssen, Eindhoven (NL); Johannes Franciscus Maria Cillessen, Eindhoven (NL); Egbertus Reinier Jacobs, Eindhoven (NL); Adrianus Sempel, Eindhoven (NL); Theodorus Johannes Petrus Van Den Biggelaar, Eindhoven (NL); Boudewijn Ruben De Jong, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/022,586

(22) PCT Filed: Sep. 19, 2014

(86) PCT No.: PCT/EP2014/070041
§ 371 (c)(1),
(2) Date: Mar. 17, 2016

(87) PCT Pub. No.: WO2015/044054
PCT Pub. Date: Apr. 2, 2015

(65) Prior Publication Data
US 2016/0234890 A1    Aug. 11, 2016

(30) Foreign Application Priority Data

Sep. 24, 2013    (EP) .................................... 13185734

(51) Int. Cl.
*H05B 33/08*    (2006.01)
*H02J 5/00*    (2016.01)

(52) U.S. Cl.
CPC .............. *H05B 33/08* (2013.01); *H02J 50/05* (2016.02); *H02J 50/12* (2016.02); *H05B 33/0806* (2013.01); *H02J 5/005* (2013.01)

(58) Field of Classification Search
CPC .. H02J 7/025; H02J 17/00; H02J 50/05; H02J 5/00; H02J 5/005; H04B 5/0012; H04B 5/0037
USPC ... 307/109, 110, 108, 104, 149, 150, 70, 71, 307/19, 20
See application file for complete search history.

(56) References Cited

U.S. PATENT DOCUMENTS

| 3,315,111 A | 4/1967 | Jaffe et al. |
| 4,614,668 A | 9/1986 | Topp et al. |
| 2012/0146431 A1 | 6/2012 | Ichikawa et al. |

(Continued)

FOREIGN PATENT DOCUMENTS

| WO | 2010031428 A1 | 3/2010 |
| WO | 2013024391 A1 | 2/2013 |

(Continued)

*Primary Examiner* — Tuyet Vo

(57) ABSTRACT

A system (100) for receiving electrical power wirelessly comprises a first (101) and a second electrode (102), with sandwiched there between at least one load module (103) dispersed in a matrix (104). Wherein at least the matrix (104) is applied in wet form.

13 Claims, 6 Drawing Sheets

(56) References Cited

U.S. PATENT DOCUMENTS

| | | |
|---|---|---|
| 2012/0181980 A1 | 7/2012 | Ichikawa et al. |
| 2013/0082540 A1 | 4/2013 | Christ |
| 2014/0191587 A1* | 7/2014 | Van Goor ............ H04B 5/0012 |
| | | 307/104 |
| 2014/0197755 A1* | 7/2014 | Willemsen .............. E04B 9/001 |
| | | 315/227 R |

FOREIGN PATENT DOCUMENTS

| | | |
|---|---|---|
| WO | 2013024404 A2 | 2/2013 |
| WO | 2013024419 A2 | 2/2013 |

* cited by examiner

WET PROCESSED ELECTRONIC SYSTEMS

CROSS-REFERENCE TO PRIOR APPLICATIONS

This application is the U.S. National Phase application under 35 U.S.C. §371 of International Application No. PCT/EP2014/070041, filed on Sep. 19, 2014, which claims the benefit of European Patent Application No. 13185734.4, filed on Sep. 24, 2013. These applications are hereby incorporated by reference herein.

FIELD OF THE INVENTION

The present invention relates to the field of wirelessly powered systems, more specifically to an efficient way of manufacturing capacitively powered systems, for instance luminaire products.

BACKGROUND OF THE INVENTION

In a wireless power transfer system energy can be transmitted from a power source to a load without the need for an electrical contact between both. Possible applications are the charging of electronic devices, but also for instance realizing illumination panels. Capacitive or inductive technologies are possible implementations for wireless power transfer. In wireless power transfer, power efficiency is a very important parameter.

For large area illumination emission surfaces based on light emitting diode (LED) sources nowadays technologies such as 2D attachment on large sheets of flexible substrates, combining multiple LED-strips in parallel, and alike, are required. WO 2013/024406 describes a transparent capacitive wireless powering system, which may for instance be used for powering lighting elements such as LEDs, LED strings, a lamp etc. The system disclosed comprises a pair of receiver electrodes connected to a load through an inductor, and a transparent infrastructure having at least a first layer of a non-conductive transparent material, and a second layer of a conductive transparent material coupled to each other. The second layer is arranged to form a pair of transmitter electrodes, wherein the pair of receiver electrodes are decoupled from the second layer, thereby forming a capacitive impedance between the pair of transmitter electrodes and the pair of receiver electrodes. A power signal generated by a driver is wirelessly transferred from the pair of transmitter electrodes to the pair of receiver electrodes to power the load when a frequency of the power signal substantially matches a series-resonance frequency of the first inductor and the capacitive impedance.

There is still room for improvement in creating free form (both in size and in surface topography) large area illumination products.

SUMMARY OF THE INVENTION

It is an object of embodiments of the present invention to provide a free form system for capacitive power transfer which is easy to manufacture.

The above objective is accomplished by a method and device according to embodiments of the present invention.

In a first aspect, the present invention provides a system for receiving electrical power wirelessly. The system comprises a first electrode and a second electrode, and at least one load module in a matrix sandwiched between the first and second electrodes. The first electrode, the load module in the matrix, and the second electrode form a capacitor stack. Of this stack, at least the matrix is applied in wet form, but optionally also the first and/or second electrode may be applied in wet form.

Applying the matrix with one or more load modules, and optionally also the first and second electrodes, in wet form allows to make new form factor electrical products, such as for instance lighting products. It is particularly advantageous if not only the matrix but also at least one of the electrodes (at least the one located away from a substrate onto which the system is manufactured), preferably both electrodes, are applied in wet form. The matrix has multiple functionalities: embedding the one or more modules and mechanically stabilizing these, for instance in a distributed pattern. Furthermore, the matrix forms and holds the stack mechanically stable, even in a vertical construction. The matrix may form, but does not need to form, a dielectric isolation between the one or more modules and the first and second electrodes. Alternatively, this isolation function may be incorporated into the load modules themselves.

It is an advantage of embodiments of the current invention to provide free form, also called odd-shaped, systems; free form meaning that both the size and the surface topography may be arbitrary. For example manufacturing of lighting walls or free form, odd shape, luminaries becomes possible when applying a method according to embodiments of the present invention. It is an advantage of embodiments of the current invention that large area illumination products can be provided.

The provided system may be a flexible system, for instance a multi-layer foil system. Such flexible system may be provided with an adhesive layer at the face of the first or second electrode remote from the matrix, such that a system is provided which may adhere to a support surface like a sticker.

It is an advantage of embodiments of the current invention that the system can be driven using a capacitive powering principle. This is due to the provision of a capacitor stack with a bottom and top conductor and a middle matrix with dispersed load module(s).

A system according to embodiments of the present invention may comprise one or more, preferably a plurality, of load modules distributed in the matrix. Providing a plurality of load modules allows to increase functionality and/or efficiency of the system. If, for instance, the load modules are LED modules, increasing the number of load modules allows for an increased light output. A free form, odd-shaped system may thus be obtained in accordance with embodiments of the present invention, based on a large number of load modules distributed, according to a regular or irregular pattern, in a matrix.

In a system according to embodiments of the present invention, the at least one load module may comprise a light emitting diode. A system according to embodiments of the present invention, although not limited thereto, is particularly suited for light emitting products, for illumination. In view of their low power consumption, LEDs are particularly useful light emitting load modules. A module may for instance be a dual LED package. Such LED packages consist of two LED dies in a parallel-anti-parallel configuration. They typically have a thin/flat form factor, wherein the thickness is much smaller than the length and the width. The thickness of such package may for instance be a few hundreds of micrometers, while its length and width may be a few millimeters.

It is an advantage of embodiments of the current invention that the system can be used as a light emitting device. In embodiments of the present invention, LEDs may be used as sources of illumination.

In a system according to embodiments of the present invention, one of the first and second electrodes may be reflective and the other one of the first and the second electrodes may be transparent or optically active.

It is an advantage of embodiments of the current invention that the light emitted by the sources of illumination, e.g. LEDs, may be reflected on one side of the system and that the other side of the system is transparent for the light emitted by the sources of illumination, e.g. LEDs. The transparent electrode allows radiation, in particular for instance visible light, to be emitted therethrough. Hence, even if such electrode covers a complete surface for transmitting electrical power, it does not disturb the illumination properties of the modules. The transparent electrode may be made from a transparent conductive film, such as a transparent conductive oxide (TCO), e.g. doped tin oxide (such as indium tin oxide (ITO)), doped zinc oxide (such as aluminium doped zinc oxide (AZO), indium doped zinc oxide (IZO)), or indium doped cadmium oxide. The reflective electrode on the other hand allows circuitry to be covered behind it, thus making it invisible for the outside world, while at the same time reflecting radiation, e.g. visible light, towards the transparent electrode, thus increasing radiation output by reflecting a portion of the radiation which would otherwise get lost.

In a system according to embodiments of the present invention, the first and/or second electrode may comprise a coating comprising metallic leafing flakes. Typically, a coating comprising metallic leafing flakes can be applied in a very thin layer, for instance a layer of a few micron thickness. Nevertheless, such thin layer provides an extremely good conductivity. The thin layer allows to cover any underlying free form and surface roughness. It also allows the final device to have some flexibility. One example of such coating is silver flakes in leitsilber. Leitsilber is a fast drying conductive silver cement with low resistance. Once dried, it has a flat surface texture. It is easy to apply at temperatures between room temperature and about 120° C., by brushing, dipping or spraying, and only requires a drying time of about 10 minutes at 20° C.

In a system according to embodiments of the present invention, the first and/or second electrode is an Indium tin oxide layer. Indium tin oxide or tin-doped indium oxide (ITO) is currently the best known and most widely used transparent conductive oxide. It is widely spread because of the ease with which it can be deposited as a thin film.

In a system according to alternative embodiments of the present invention, the first and/or second electrode may be comprising or consisting of silver nanowires and/or carbon nanotubes and/or grapheme, for instance coated on a flexible foil. It is an advantage of embodiments of the current invention that silver nanowires, carbon nanotubes and grapheme can be applied as a wet coating, that they are transparent and that they are less brittle than for instance tin-doped indium oxide.

In a system according to embodiments of the present invention, the matrix may comprise at least a first layer and a second layer of dielectric material, the at least one load module touching the first layer of dielectric material and being embedded in the second layer. If a first dielectric layer is provided between the first electrode and the one or more modules, the modules themselves do not need to be isolated, for instance do not need to be provided with a supplementary insulation layer for instance integrated in the load module, e.g. LED module, package. If first a dielectric layer is provided between the first electrode and the one or more modules, a predetermined, e.g. fixed, distance, and hence a predetermined, e.g. fixed, capacitance may be obtained between the load modules and the first electrode. Optimization of this fixed capacitance has its importance in the wireless, e.g. capacitive, transmission of electrical power between the first electrode and the one or more load modules.

In embodiments of the present invention, the matrix may be a transparent or translucent polymer matrix. Such transparent or translucent matrix is particularly useful for lighting applications. It allows light, e.g. visible light, generated by the one or more modules, to be distributed towards the outside world after emission from the one or more lighting modules, e.g. LED modules. Examples of a suitable polymer matrix are acrylic, epoxy, polyurethane, silicone. Advantages of such polymer matrix is that modules do not settle. Furthermore, the viscosity of such material is suitable for application in wet form, such as for instance, but not limited thereto, brushing, rolling, stencil printing, blading.

A system according to embodiments of the present invention may comprise a connector for connecting the first electrode and the second electrode to a drive circuit. Such connector allows to obtain a functional device. It allows to galvanically connect the first and second electrodes to a drive circuit, for instance comprising or consisting of a power mains. The connector may comprise a conversion unit for converting power mains to suitable electrical signals for driving the one or more load modules.

It is an advantage of embodiments of the current invention that a power mains can be easily connected with the system for capacitive power transfer.

A system according to particular embodiments of the present invention may lack conductive material in the first and second electrodes in areas were no load module is sandwiched between the two electrodes. This provides reduced parasitic capacitance between the first and second electrodes, hence increased power efficiency of the system.

In particular embodiments, the first electrode and the second electrode may each comprise one or more conductive strips, wherein the conductive strip(s) of the first electrode are differently oriented than the conductive strip(s) in the second electrode so as to form a patterned structure with at least one overlapping region between first and second electrodes. In such embodiments, the at least one load module is located at the at least one overlapping region of the first and second electrodes. This embodiment possibly provides the least conductive material present outside the location(s) where load modules are present. Hence this embodiment provides good power efficiency characteristics for the system. Depending on the number of overlap locations between conductive strips of the first and second electrodes, and the number of load modules being present, parasitic capacitance may be virtually absent.

A system according to embodiments of the present invention may furthermore have a larger distance between the first and second electrodes in areas where no load module is sandwiched between the two electrodes than in areas where a load module is sandwiched therebetween. By increasing the distance between the first and second electrodes at locations outside where load modules are present, the parasitic capacitance is reduced.

In embodiments of the present invention, the at least one load module may have a hydrophobic coating on at least one side facing at least one of the first or second electrodes. The hydrophobic coating allows to easily obtain the larger distance between the first and second electrodes in areas where no load module is sandwiched between the two electrodes than in areas where a load module is sandwiched therebetween. The matrix, being applied in wet state, will try to move away from the hydrophobic coating, thus automatically providing the height difference. This way, a self-aligned system may be provided.

In a second aspect, the present invention provides a method for manufacturing a system for receiving electrical power wirelessly. The method comprises providing a first electrode, applying on the first electrode a matrix in wet form wherein at least one load module is embedded in the matrix, and applying on the matrix a second electrode. The first electrode, the at least one load module embedded in the matrix, and the second electrode form a capacitor stack. Wet application of the matrix with one or more embedded load modules allows creation of free form (both in size and in surface topography) products. The created products can optionally be large area products; for instance full wall covering can be provided. The created products can optionally be flexible products, such as for instance sticker products.

It is an advantage of embodiments of the current invention that it provides methods allowing an easy placement of the load modules and an easy embedding of the load modules in a matrix.

It is an advantage of embodiments of the current invention that a controlled placement method of the load modules is not required. In embodiments of the present invention the load modules can be located on any arbitrary position between a first and a second electrode.

In embodiments of the present invention, applying a matrix in wet form may comprise applying a first layer of dielectric material, thereafter placing the at least one load module on this first layer, and then applying a second layer of dielectric material, thereby embedding the at least one load module in this second layer. Applying a first dielectric layer between the first electrode and the one or more modules allows for the use of modules that themselves do not need to be isolated, for instance do not need to be provided with a supplementary insulation layer for instance integrated in the load module, e.g. LED module, package.

In embodiments of the present invention, the matrix may be applied through painting, spraying or rolling. These are well-known and easy-to-implement, hence cheap, methods of applying wet matrix material.

It is an advantage of embodiments of the current invention that a system according to embodiments of the present invention can be applied on a support or substrate having an arbitrary form.

A method according to embodiments of the present invention may furthermore comprise, after applying the second electrode, removing conductive material from the first and/or second electrodes in areas where no load module is sandwiched between the two electrodes. This is advantageous because it reduces the parasitic capacitance and hence increases the efficiency of the system so manufactured.

In a method according to embodiments of the present invention, providing the first electrode may comprise applying first conductive strips on a substrate, and applying the second electrode may comprise applying second conductive strips which are differently oriented compared to the first conductive strips of the first electrode, so as to form a patterned structure with at least one overlapping region between first and second electrodes. Applying second conductive strips of the second electrode may then be such that the at least one load module is positioned at an overlapping region of the first and second conductive strips. This embodiment provides good power efficiency characteristics for the system. Depending on the number of overlapping regions compared to the number of load modules, parasitic capacitance may be virtually absent.

In a method according to embodiments of the present invention, applying on the first electrode a matrix in wet form wherein at least one load module is embedded in the matrix, may include providing at least one load module having a hydrophobic coating on at least one side, such that when applying the wet matrix, it is repelled from the at least one load modules at at least one side. By providing a hydrophobic coating at at least one side of the load modules, the matrix material will be repelled from there, and more matrix material will automatically be present at locations where no load modules are present than at locations where load modules are present. This reduces the parasitic capacitance of the obtained system.

In a method according to embodiments of the present invention, applying a matrix wherein at least one load module is embedded may comprise applying a matrix wherein at least one LED module is embedded.

In a further aspect, the present invention provides for the use of a system as in accordance with the first aspect of the present invention. Such system may for example be used in a wall-type application, e.g. by wet application directly onto the wall-type substrate or by adhering the system as a sticker on the wall-type substrate. In embodiments of the present invention, a system according to embodiments of the first aspect of the present invention may be used in a free form luminaire product.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
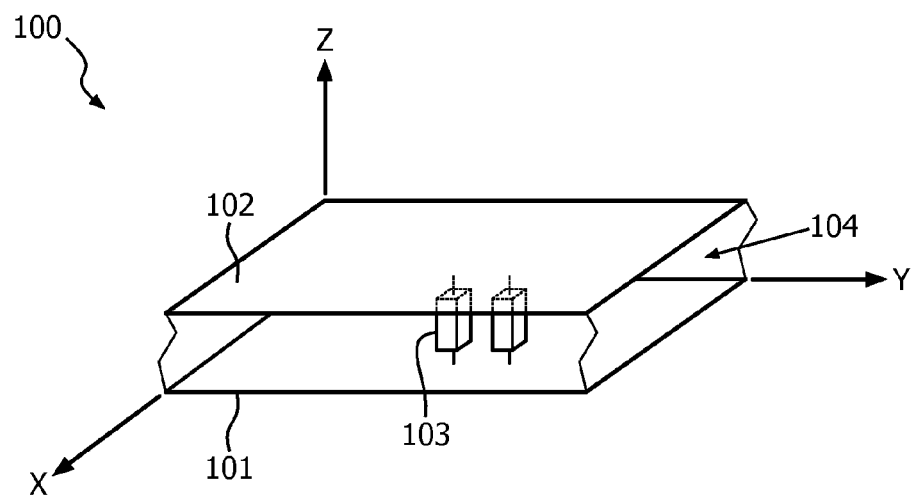
FIG. 1 provides a schematic 3D view of load modules sandwiched between two conductive layers, as used in a capacitive powering system in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the current invention reference is made to a matrix, reference is made to dielectric material in between the electrodes in which at least one load module is, and advantageously a plurality of load modules are embedded. In particular embodiments of the current invention the matrix may comprise different layers of dielectric material. Suitable matrix materials may be, the present invention not being limited thereto, silicone, acrylic, epoxy or polyurethane based materials. Examples may be inorganic materials such as e.g. $HfO_2$, $Ta_2O_5$, $Al_2O_3$, $CeO_2$; or organic materials such as e.g. PVA, CYEPL. Organic materials are particularly useful because they are easily combinable with a low temperature process flow. Inorganic thin film layers are particularly suitable for application on the package or load product. Organic materials are more suitable for dipping, spraying etc.

Where in embodiments of the current invention reference is made to an optically active electrode reference is made to an electrode made of a material that has both an electrical functionality (electrical conductivity, for forming a capacitor plate) and an optical characteristic, such as providing sufficient transparency so as to allow light to leave the system, or being reflective, so as to prevent light from leaving the system or so as to redirect light so as to leave the system at another side thereof.

Where in embodiments of the current invention reference is made to a homogeneous matrix, reference is made to a matrix comprising matrix material surrounding the electrodes, wherein the matrix material has a constant permittivity over the complete volume surrounding the electrodes. Hence all matrix material between the two electrodes has the same permittivity. This stands in contrast to an inhomogeneous matrix, where the matrix material filling the space between the electrodes and surrounding the load modules comprises at least two types of material with different permittivity.

In a first aspect, the present invention relates to a system for capacitively powering at last one and optionally a plurality of load modules. Embodiments of the current invention can be used for powering different kinds of load modules, such as for example, the present invention not being limited thereto, LED modules. According to embodiments of the current invention, as illustrated in FIG. 1, the system comprises a first electrode 101 and a second electrode 102 and a matrix 104 sandwiched between the first 101 and a second electrode 102. The system furthermore comprises at least one load module 103 in a matrix 104 sandwiched between the first and second electrode 101 and 102. The load module 103 in the matrix 104, the first electrode 101 and the second electrode 102 form a capacitor stack.

In embodiments of the present invention the matrix 104 and possibly also the first and second electrode 101 and 102 are applied through wet processing. Such wet processing can be any processing whereby the material to be applied is in a wet, e.g. fluid, form. A drying step may be needed after application of the material in wet form, in order for it to harden out. Suitable wet processing techniques are for instance painting, spraying, rolling or the like.

In embodiments of the present invention, the load modules 103 may be lighting modules, such as for instance LED modules. Embodiments of the present invention can transform free form and odd-shaped surfaces into emissive surfaces, by applying a matrix with embedded lighting modules onto the surfaces. It is an advantage of embodiments of the current invention that arbitrary form factors can be obtained: applying matrix material with embedded load modules by for instance spraying or painting is fairly easy, independent of the shape and size of the substrate to be covered. This means that for example generating systems allowing full wall surface emission becomes possible. Also forming luminous devices from an odd shaped base structure becomes possible. The base structure may have an arbitrary size and surface topography, which may be substantially completely or even completely be covered by a wet application process as in accordance with embodiments of the present invention, in particular if not only the matrix but also the first and second electrodes are applied in wet form. The final product may have full form flexibility. The system may be fabricated as a flexible system, for instance a multi-layer foil system, in which not only the matrix but also the first and second electrodes are flexible. Such flexible system may be provided with an adhesive layer at the face of the first or second electrode remote from the matrix, such that a system is provided which may adhere to a support surface like a sticker.

In embodiments of the present invention the system 100 can be driven based on a contactless, non-galvanic interconnection, as the load modules 103 may be powered by a capacitive AC electrical driving principle.

Figure 2:
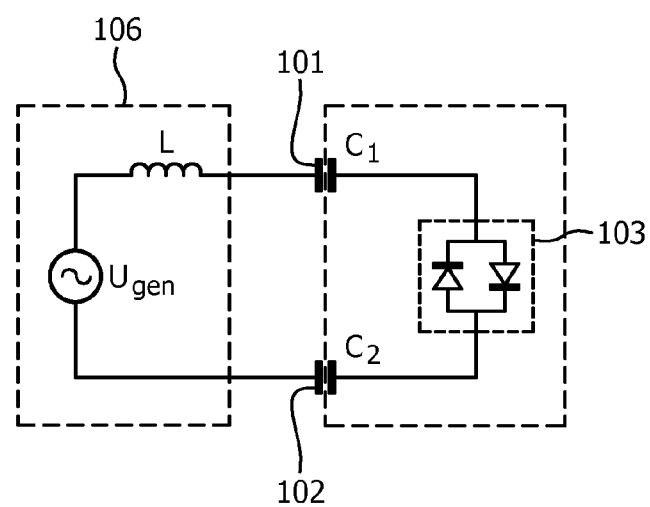
FIG. 2 illustrates in an electrical scheme the principle of a capacitive powering system according to embodiments of the present invention.

FIG. 2 shows an electrical scheme illustrating in general the principle of capacitive powering. A single load module 103 is illustrated, which in this case comprises two LED dies in a parallel-anti-parallel configuration. The capacitances C1, C2 are respectively the capacitive coupling between the first electrode 101 and the load module 103 and the capacitive coupling between the second electrode 102 and the load module 103. Also illustrated is a drive circuit 106 coupled to the first and second electrodes 101, 102.

Figure 3:
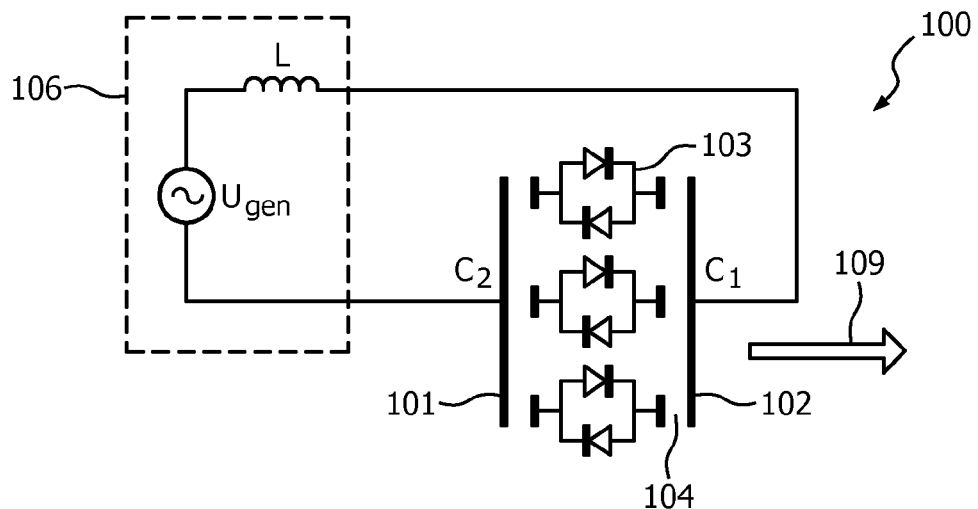
FIG. 3 illustrates in an electrical scheme a possible implementation of a capacitive powering system according to embodiments of the present invention, comprising three LED modules and a transparent electrode.

FIG. 3 shows an electrical scheme of a system according to an embodiment of the present invention. The system 100 comprises a plurality of LED modules 103, three LED modules 103 being illustrated, between a first electrode 101 and a second electrode 102. A matrix 104 of suitable material is present between the first and second electrodes 101, and provides structural stability to the system 100. The matrix 104 keeps the modules 103 in place. The modules 103 are illustrated in a regular array, however, the present invention is not limited thereto, and modules 103 may be freely distributed in the matrix 104. In embodiments of the present invention the load modules 103 can be freely placed between the first and second electrode. Therefore in embodiments of the current invention the need for a controlled placement method during manufacturing of such device is removed. A drive circuit 106 for powering the system 100, more particularly for capacitively powering the system 100, is also illustrated. The drive circuit is an AC drive circuit. The second electrode 102 is a transparent electrode, allowing for emission into the ambient of light 109 generated by the LED modules 103.

Figure 4:
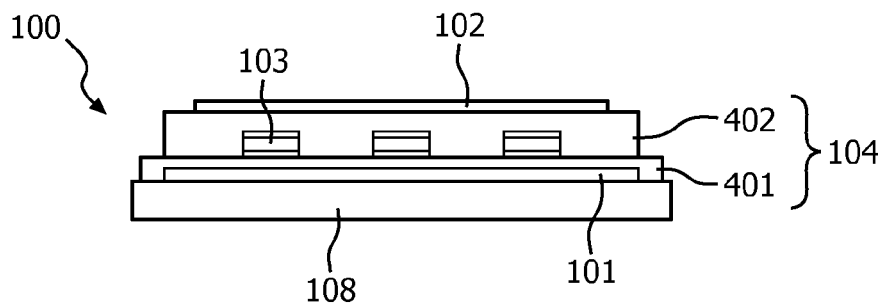
FIG. 4 schematically illustrates different layers of a capacitive powering system according to embodiments of the current invention.

According to embodiments of the current invention, the system 100 comprises in its basic format three functional layers: a first electrode 101 (also called bottom electrode, typically being an electrode applied onto a carrier substrate 108; the carrier substrate 108 may define form and shape of the final system 100), a matrix 104 comprising at least one and optionally a plurality of load modules 103 dispersed therein, and a second electrode 102 (also called a top electrode). FIG. 4 illustrates such an embodiment where at least some of the layers, including at least the matrix 104, are applied as wet layers. On top of the carrier substrate 108, first a first electrode 101 is applied. The first electrode 101 may be composed of any suitable conductive material. Preferably the first electrode 101 is applied in wet form, as this more easily allows to cover uneven or odd-shaped carrier substrates. Application technologies may for instance be painting, such as for instance spraying e.g. by means of a spray gun, rolling e.g. by means of a roller, optionally a roller with cavities or indentations for providing a structured pattern, or brushing e.g. by means of a brush, stencil printing or blading. In a particular embodiment, the first electrode may comprise sprayed conductive particles, e.g. Ag flakes, in a matrix. In the embodiment illustrated, the matrix 104 is composed of two layers of dielectric material. A first dielectric layer 401 may be any suitable dielectric layer which covers the first electrode 101. Preferably also the first dielectric layer is applied in wet form, as this allows to easily follow the shape defined by the carrier substrate 108 and already covered by the first electrode 101. In a particular embodiment, the first layer of dielectric material 401 may be a sprayed silicone layer. The at least one load module 103 is/are then placed on the first dielectric layer 401. Hereto, a suitable placement tool may be used, such as for instance the pick and place tools as used in semiconductor processing. This placement tool can distribute the load modules in a regular or irregular pattern. In alternative embodiments, however, no dedicated placement tool is required, and the modules 103 can be provided, in the matrix 104, by mass placement techniques such as for instance pouring, casting, spraying, brushing. It is an advantage of embodiments of the present invention that an accurate location of deposition of the modules 103 is not required, as long as they are located in between the first and second electrodes 101, 102.

After placement of the at least one load module 103, the load modules 103 may be embedded in a second dielectric layer 402 of the matrix 104. This second dielectric layer 402 may also be applied in wet form, and covers at least the at least one load module 103. In alternative embodiments, rather than having separate steps of placement of the load modules 103 and covering of the load modules 103 by dielectric material, the load modules 103 may be dispersed in the second layer 402 of dielectric material, and load modules and second layer 402 of dielectric material may be simultaneously deposited onto the first layer 401 of dielectric material. In embodiments of the current invention where the load modules 103 are illumination modules, the second layer 402 serves as light guidance layer, and has corresponding properties which allow the radiation generated and emitted by the load modules 103 to pass through it an be emitted to the outside world. In alternative embodiments, the second layer 402 can have additional optical characteristics, such as diffusion, scattering, light conversion. For this latter, light converting material such as for instance phosphor material may be dispersed into the material of the second layer 402. The matrix 104 furthermore provides structural and mechanical stability to the system 100. The second electrode 102 is applied onto the second dielectric layer 402, preferably also in wet form so as to follow the underlying shapes and forms. The second electrode 102 may for instance be applied as a wet ITO layer. The first electrode 101 and the second electrode 102 form capacitor plates.

The matrix 104 embeds the at least one load module 103 (e.g. LED packages) and mechanically stabilizes them. If a plurality of load modules 103 are provided, they may be stabilized in a distributed pattern, which may be regular or irregular. In illumination embodiments of the present invention the matrix 104 should be able to distribute the light emitted by the LED packages. In embodiments of the present invention the matrix 104 also provides mechanical stability to the system 100. In embodiments of the present invention the matrix 104 also supports the dielectric isolation between LED package and the first 101 and second 102 electrode. This isolation function, however, can also be integrated in the load modules 103, for instance by an isolation layer provided on or in the package of the load modules 103, or by an additionally applied dielectric layer deposited on the first or second electrode 101, 102.

Figure 5:
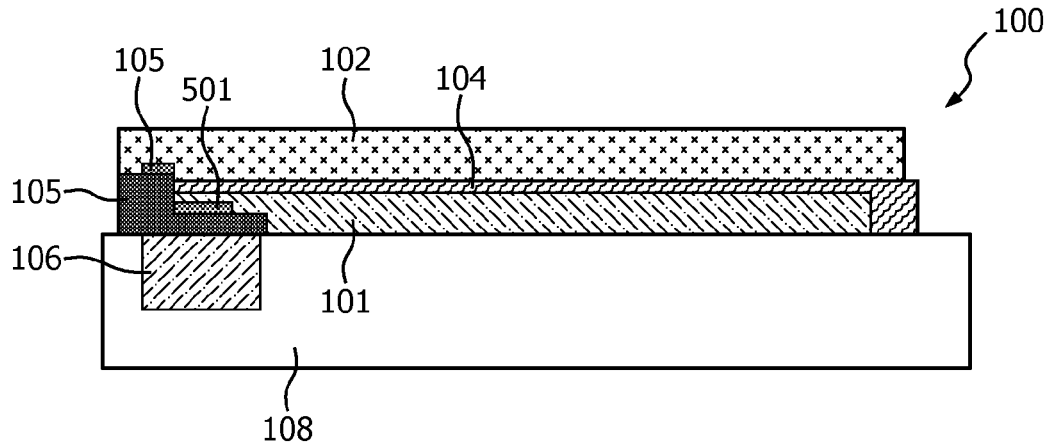
FIG. 5 schematically illustrates different layers of a capacitive powering system including an example of implementation of a power connector according to embodiments of the current invention.

Embodiments of the present invention may additionally comprise a connector 105 for connecting the first and second electrode 101, 102 to mains or to a drive circuitry, such as for instance an AC drive circuitry. One embodiment is schematically illustrated in FIG. 5. In this embodiment, a light emitting wall covering is provided. The carrier substrate 108 may thus for instance be a wall, in which a power source or drive circuit 106, for example a mains socket, is provided. In this construction first a dedicated plug or connector 105 is inserted in the mains socket 106 in the wall 108. The plug includes an electrical connection between an input power source, e.g. the mains, and the first and second electrode 101, 102, with optionally a drive circuit in between both. The drive circuit may be adapted for connecting input power, e.g. mains, into an electrical signal suitable for driving the circuit 100 in accordance with embodiments of the present invention. This connector 105 allows connecting, during wet application of the layers of the stack, the electrode layers 101, 102 to the connector 105. Hereto, a method of over-coating may be used, followed by clearing a next interconnect contact pad for instance by a sticker-type lift-off removal. The connector may comprise two electrically conductive wires (not illustrated in FIG. 5), each for being connected to the drive circuit 106, for instance for being connected to both poles of a mains socket, insulated from one another by means of a piece of insulating material. The extremities of the conductive wires may each land on a contact pad 501, 502 accessible from the outside of the connector 105. When providing the first electrode 101 on the carrier substrate 108, preferably in wet form, for instance by spraying, not only the wall 108 but also the connector 105, and in particularly at least the first contact pad 501, is covered with electrode material. In order to prevent short-circuiting of the system, part of the connector 105 that should not make electrical contact to the first electrode 101, for instance the second contact pad 502, needs to be cleared before application of the second electrode 102. Something similar happens when applying matrix material: not only the first electrode 101 but also the connector 105 is covered by matrix material. Such matrix material should be removed from the connector 105, at least from the second contact pad 502 thereof, in order to provide a good electrical contact between the second contact pad 502 and the subsequently applied second electrode 102. In order to clear the second contact pad 502 and allow it to make a good electrical contact to the second electrode 102, a removable protective layer, e.g. a protective sticker, could be applied on the second contact pad 502 before application of the first electrode 101 and matrix 104. The removable protective layer can then be removed before application of the second electrode 102, thus also removing other applied materials, such as first electrode material and matrix material, and thus clearing the second contact pad 502. Such connector 105 allows sequential provision of wet layers while still allowing electrical connection to these layers.

Figure 6:
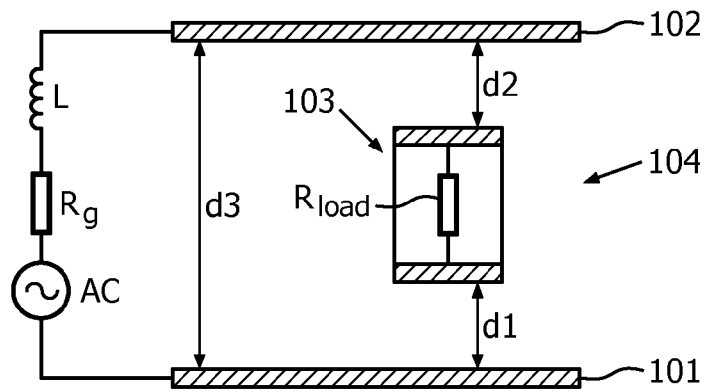
FIG. 6 gives a schematic illustration of a capacitive powering system indicating d3, the distance between the electrodes as one of the parameters for the parasitic capacitance between the electrodes, and d1, d2, as parameters for the wanted load module capacitances according to embodiments of the current invention.

FIG. 6 schematically shows the main components in a capacitive powering system, including a capacitive powering system according to embodiments of the present invention. FIG. 6 is mainly illustrative to indicate the operation principle and also helps in understanding the cause of inefficient transfer of power which may happen in a capacitive powering system. FIG. 6 shows an example of a capacitive powered load module 103 (e.g. a LED lamp). Multiple load modules 103 may be present, but are not shown in this figure. The load module 103 is placed between a first and a second electrode 101 and 102 at a distance d3 from one another. These electrodes 101, 102 form a parasitic capacitance C3 at locations where no module 103 is present. A wanted coupling capacitor C1 is formed between the first electrode 101 and the load modules 103 and the wanted coupling capacitor C2 is formed between the second electrode 102 and the load modules 103. The capacitance values C1, C2 are determined by gaps d1 and d2, the module area A and the insulating medium permittivity ($\in$):

$$ci = \frac{\varepsilon A}{di}$$

Electrical power is supplied by an AC source with impedance:

$$Z = R_g + j \cdot 2\pi \cdot f \cdot L$$

of which the inductive part j·2·pi·f·L is chosen to compensate for the capacitive part of the total load of the system at a resonance frequency f.

In such a construction the parasitic capacitor C3 can be large compared to the wanted capacitor C1 (in series with C2), especially when large substrate areas, and hence large first and second electrodes 101, 102 are used. Even with many load modules 103 per square meter, C3 cannot be neglected in the total system capacitance. This has important consequences with regard to an efficient power transfer for a capacitive powering system:

With large C3 compared to C1+C2, the resonance frequency is determined mainly by C3 and L.

Only a small fraction, approximately $$\frac{c1 + c2}{c3}$$

of the total current is available for driving the load module.

Power loss is high as the total current flows through the source resistance Rg.

Embodiments of the present invention provide a sandwich structure with a first and a second electrode 101, 102 with inbetween a matrix 104 of dielectric material and at least one load module 103. This system has a load module capacitance, which is the overall capacitance between the first and second electrode 101, 102 are areas where a load module 103 is present. This system also has a parasitic capacitance, which is the overall capacitance between the first and second electrode 101, 102 at areas where no load module 103 is present. It is advantageous that embodiments of the present invention can have, compared to other embodiments where no special measures are taken, a decreased parasitic capacitance and/or an increased load module capacitance. Decreasing the parasitic capacitance and/or increasing the load module capacitance increased the power efficiency of the system.

For comparison reasons, a reference structure is defined based on this original structure with no special measures taken to decrease parasitic capacitance C3 and/or to increase load module capacitance C1+C2.

The reference capacitances are those of the reference structure with constant thickness and with a homogeneous matrix and with electrodes on both sides forming the smallest convex area enclosing the complete area taken by the load modules.

The distance between both electrodes in the reference structure is equal to the minimal distance between the electrodes in the original structure. The permittivity of the matrix in the reference structure is equal to the average permittivity of the matrix of the original structure. The load modules of the reference structure are in the same configuration as the load modules of the original structure.

By way of illustration, embodiments of the present invention not being limited thereto, a number of examples of capacitive powering systems with increased efficiency are given in the sections below. Particularly good embodiments are embodiments where the system 100 lacks conductive material in the first and second electrodes 101, 102 at locations where no load modules 103 are sandwiched between the first and second electrodes 101, 102. This may be implemented in a variety of ways, of which a few are exemplified below.

Figure 7:
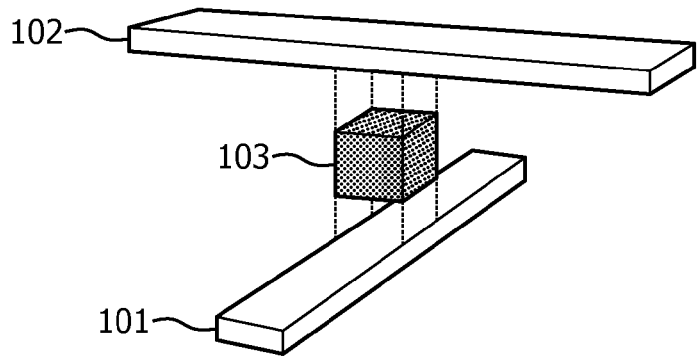
FIG. 7 illustrates the positioning of two conductive strips and a load module according to an embodiment of the current invention.

In an exemplary embodiment, instead of large area electrodes 101, 102, a patterned structure of first and/or second electrodes is used. FIG. 7 shows an example of a first electrode 101 and a second electrode 102 each of the electrodes comprising at least one conductive strip. In the embodiment illustrated the first and second electrodes 101, 102 each only contain one strip, but the invention is not limited thereto. Each of the first and/or second electrodes 101, 102 may contain a plurality of strips. The number of strips in the first and second electrodes 101, 102 does not need to be equal. In the embodiment illustrated, the conductive strips are perpendicular lateral conductors. A load module 103 is placed at a region where a strip of the first electrode 101 overlaps with a strip of the second electrode 102, as shown in FIG. 7. Here the parasitic capacitance C3 is virtually absent, as there is virtually no capacitive coupling between the first and the second electrode 101, 102 at locations where no modules 103 are present. The example in FIG. 7 shows orthogonal conductive strips, each in one layer, with in between them a load module 103 on the place of the overlap. In a more general embodiment, the first electrode 101 comprises a plurality of conductive strips and the second electrode 102 comprises a plurality of conductive strips, wherein the conducive strips in the first electrode 101 are simply differently oriented than the conductive strips in the second electrode 102. They can be, but do not need to be, orthogonal. In certain embodiments of the current invention, on at least one overlap region between a conductive strip of the first electrode 101 and a conductive strip of the second electrode 102 a load module 103 is positioned. As a consequence of the realized patterned structure, the parasitic capacitance is decreased with regard to the reference parasitic capacitance. The load module capacitance is, however, the same as the reference load module capacitance.

Figure 8:
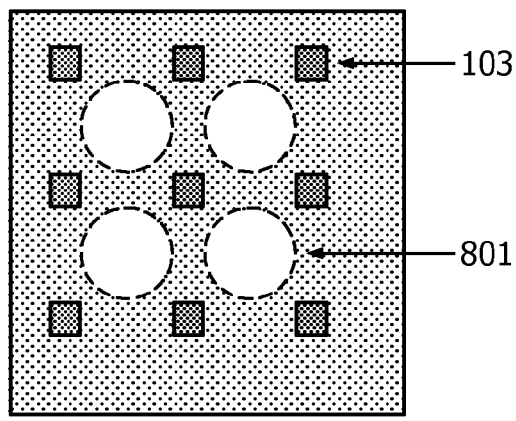
FIG. 8 illustrates the presence and location of holes in the electrodes with respect to the position of the load modules, according to a embodiment of the current invention.

In another exemplary embodiment, the first and second electrode 101 and 102 sandwiching the load modules 103 are not covering the complete area with conductive material as on places where no load modules 103 are present at least conductive material has been removed. An example of such an embodiment of the current invention is illustrated in FIG. 8. This embodiment may be realized by removing, after mounting of the load modules 103 between the sandwich of electrodes 101, 102, at least some of the material in between the load modules 103, including at least removing electrode material. Several techniques are possible, like for instance etching of electrode material, or drilling holes 801 through the structure. Special measures can be taken to affect the optical properties caused by these holes. Also in this embodiment the parasitic capacitance C3 is decreased compared to the reference parasitic capacitance. In embodiments of this invention the load module capacitance C1+C2 remains the same as in the same reference structure without material being removed.

Figure 9:
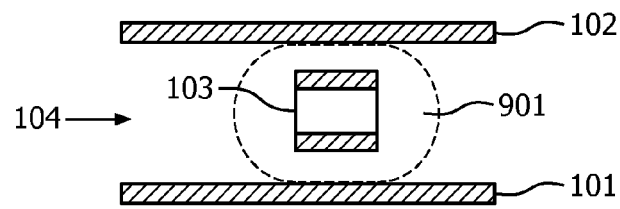
FIG. 9 schematically illustrates a load module embedded in a layer or envelope of a dielectric with high permittivity sandwiched between two electrodes according to embodiments of the present invention.

In another exemplary embodiment, as illustrated in FIG. 9, the at least one load module 103 is embedded in a layer or envelope 901 of high permittivity material. Such layer or envelope 901 of high permittivity material may be provided for instance by immersing the module 103 in high permittivity material before applying it in the matrix 104. Alternatively, the layer or envelope 901 of high permittivity material may be provided by dripping such material onto the modules 103, before including them into the matrix 104. The layer or envelope 901 may have a thickness of a few micrometers, e.g. between 1 and 2 µm. The high permittivity material has a permittivity which is higher than the permittivity of the matrix material.

The embodiment furthermore comprises a first and a second electrode 101, 102 and a matrix 104. The layer or envelope 901 of high permittivity material forms part of the matrix 104. By embedding the load modules 103 in a layer or envelope 901 of high permittivity material the load module capacitance C1+C2 is increased with respect to the reference structure. Also a small fraction of C3 (the area within the layer or envelope) is increased, but its parasitic contribution can be small as the associated area may be small, in view of the limited thickness (a few micrometers) of the layer. As the load module is embedded in a layer or envelope of dielectric with a high permittivity, the layer or envelope preferably being applied before the modules are embedded in the matrix material, the increased capacity region is always aligned with the position of the load module.

Figure 10:
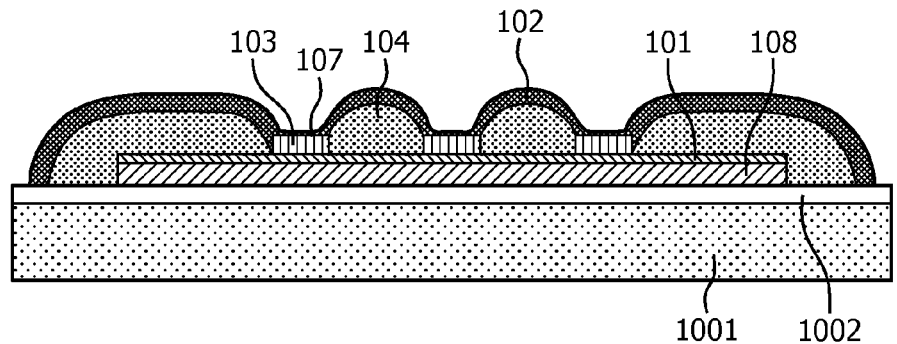
FIG. 10 gives a schematic cross-sectional view of a capacitive powering system wherein the thickness between the electrodes is smaller at the position of the load modules than in between places where load modules are present, according to embodiments of the current invention.

In yet another exemplary embodiment, the system comprises a first electrode 101, a plurality of load modules 103 (optionally LED modules), a matrix 104 (optionally a transparent matrix), and a second electrode 102. The thickness d3 between the first and second electrode 101 and 102 at locations where no module 103 is present is increased to reduce the parasitic capacitance C3. In this embodiment, this may be obtained for instance by providing the load modules 103 with a hydrophobic coating 107, e.g. parylene or AF16000, so as to repel the matrix 104 when it is applied in wet form. Therefore the thickness of the matrix 104 will be smaller on load module 103 positions than in between the load modules 103. The thickness variation is inherently aligned (self-aligning) with the position of the load modules 103 because of the hydrophobic coating 107 of the load modules 103. FIG. 10 illustrates such a layout. The load modules 103 used in FIG. 10 are LED modules. However, the current invention is not limited to the use of LED modules, other load modules 103 are also possible. In embodiments of the current invention, a load module 103 comprises an electrode on both sides and these electrodes are coated with a thin, e.g. a few micrometers thick, dielectric layer, to prevent short-circuiting of the system in case a load module comes into direct electrical contact with one of the first and second electrodes 101, 102. A thick, e.g. a few tens of micrometers thick, dielectric layer 104 is present between the load modules 103, resulting in a decreased parasitic capacitance C3. The second electrode 102 is close to the load modules 103 (in view of the thin dielectric layer) resulting in an increased load module capacitance C2. In embodiments of the current invention, the presence of a hydrophobic coating 107 on each load module 103 results in a matrix 104 which is thick between the load modules 103 and thin above the load modules 103. In such embodiments of the present invention the parasitic capacitance is decreased and the load module capacitance is increased compared to a similar reference system where a flat top electrode 102 would be applied at the top level of the modules 103. The first electrode 101 in the example of FIG. 10 may be a transparent conductor (e.g. but not limited thereto ITO, IZO, FTO) on a transparent flexible substrate 108, e.g. a plastic foil. The matrix 104 is applied in wet form on the first electrode 101, and is repelled from the load modules 103, thus self aligning between the modules. The second electrode 102 is preferably also provided in wet form, e.g. by spraying, coating, brushing, rolling. In the embodiment illustrated, the thus obtained system 100 is provided on a rigid carrier 1001, e.g. a temporary carrier, for instance a glass or polycarbonate carrier. Fixation of the system 100 to the rigid carrier 1001, for structural rigidity and/or for handling purposes may be done in any suitable way, for instance by means of an adhesive layer 1002, e.g. a temporary adhesive layer. The temporary adhesive layer 1002 may be such that its adhesive force may be diminished in any suitable way, for instance under influence of light or temperature, so as to be able to remove the temporary carrier 1001 from the formed structure. Examples of a suitable temporary adhesive layer is WaferBOND® CR-200 from Brewer Science. Such temporary adhesive layer may be applied by spinning and curing, e.g. baking; and may be removed under influence of heated chemistry. In embodiments of the present invention, making the load modules 103 hydrophobic may be done in several ways, such as for instance:

1) a thin hydrophobic coating, for instance a parylene coating, can be applied to the load modules 103, by vacuum deposition;

2) a thin hydrophobic coating, for instance a teflon-comprising coating, can be applied from solution and cured (e.g. AF1600, Dupont).

The load modules, e.g. LED modules in FIG. 10, are placed on the first electrode 101. An accurate positioning is not required in accordance with embodiments of the present invention. The load modules 103 may for instance be printed in case of many modules to be provided. FIG. 10 also shows a dielectric (the matrix 104) filling all of the space between the load modules 103, but not being present on top of the load modules 103 because they have a non-wetting property. Examples of dielectric materials, however not with the intention to provide a limiting list, are optical grade silicones, polyurethanes and epoxies. The example of FIG. 10 comprises a second electrode 102 made of reflecting material (for example silver). This is particularly useful in illumination applications. The light produced by the load modules 103, being illumination modules such as LED modules, will be reflected by the second electrode 102 and will be emitted through the transparent first electrode 101.

In yet another embodiment (not illustrated in the drawings), the change of wetting properties is not only used for self-aligning matrix material 104 with the modules 103 as in FIG. 10, but also for self-aligning a patterned second electrode 102 with the modules 103, such that electrode material is prevented from being present at locations where no modules 103 are present. This is another option to reduce the parasitic capacitance. Rather than depositing and sequentially removing the second electrode material 102, this second electrode material can be applied using the same hydrophobic principle as explained above for creating a matrix thickness variation. In the present case, the top of the components and the overall stack has to be reset to hydrophilic for the top-electrode process step to be applied, if this top electrode is also applied in wet form. In the present embodiment, however, prior to applying the second electrode material 102, first the top regions of the matrix material 104 (the thick regions) may be made hydrophobic, for instance by using a roller coating process. This process is self-aligned because of the presence of the topography. Once the tops of the hills are set to hydrophobic, a wet coating layer may be applied, for instance by spraying. The hydrophobic top regions of the matrix material will not wet, thus preventing formation of a top electrode at that area.

In another exemplary embodiment, a dielectric with different permittivity is used depending on the region in the sandwich structure. However, where in the exemplary embodiment illustrated in FIG. 9 the load module 103 was embedded in a layer or envelope 901 of a dielectric with high permittivity, the present embodiment only has a dielectric with higher permittivity on the two opposite sides of the load module 103 facing the first and second electrode 101, 102 of the sandwich structure. This may obtained for instance by dripping higher permittivity material on two opposing sides of the load modules 103. It is an advantage, compared to the previous example, of such an embodiment of the current invention that the load module capacitance C1+C2 is increased without increasing the parasitic capacitance.

Figure 11:
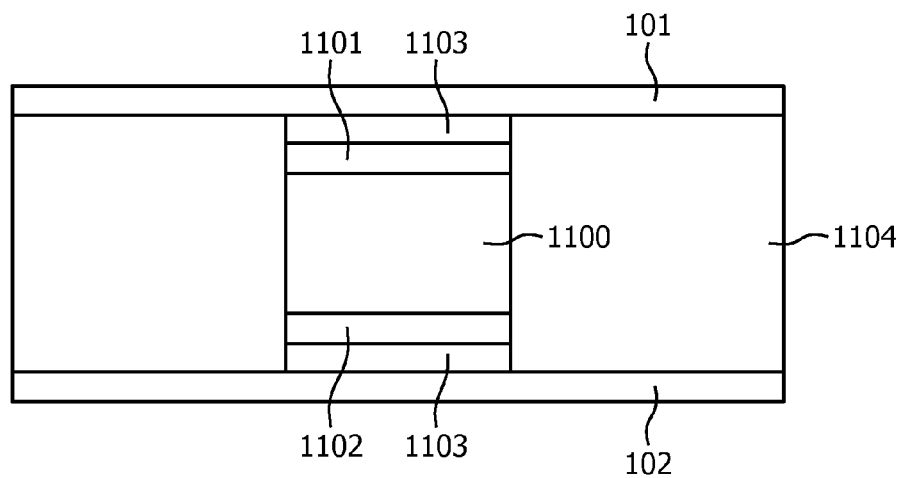
FIG. 11 shows a schematic cross-section of a LED module sandwiched between dielectric material having another permittivity than the permittivity of the dielectric next to the load module.
Figure 12:
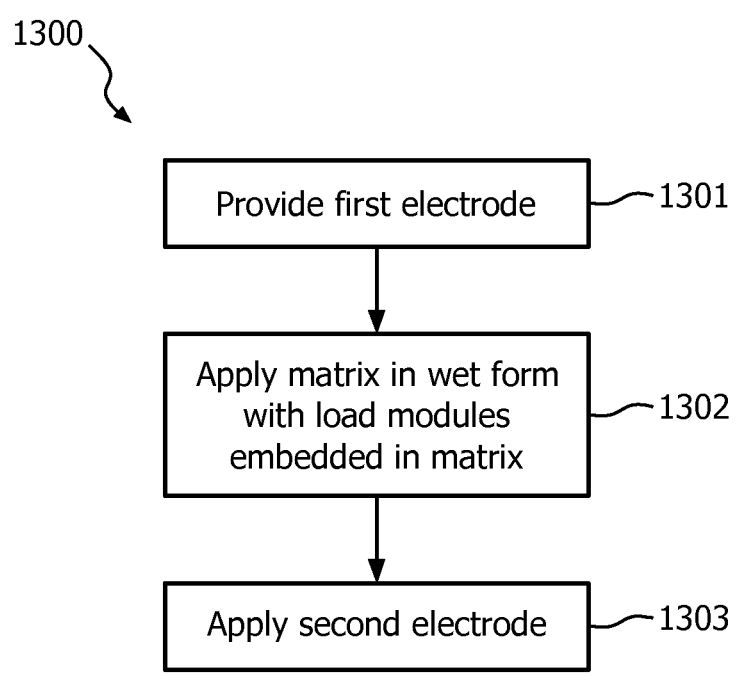
FIG. 12 shows a flow chart illustrating steps in an exemplary method for making a system for receiving electrical power wirelessly, according to an embodiment of the present invention.

FIG. 11 shows a load module 103 comprising a LED package 1100 with first and second LED terminals 1101, 1102 between a first and a second electrode 101 and 102, where the dielectric 1103 on the first and second LED terminals 1101, 1102 consists of a material with such a structure that it holds on to a liquid with high dielectric constant like for instance water. An example of such a material is a hydrogel. A hydrogel is a 3D cross-linked network of hydrophilic polymer chains that can hold a large volume of water. Examples of such polymers are polyvinylalcohol, poly(vinyl pyrrolidone), polyacrylicacid, polyacrylamide, polyethyleenglycol, silicones. The permittivity of these hydrogels will range between the permittivity of dry polymer (~2) and the permittivity of water (~80), depending on the amount of water absorbed by the gel. The hydrogels can be applied as wet coatings. It is an advantage of embodiments of the current invention that the overall dielectric constant of the dielectric 1103 on the LED terminals 1101, 1102, and hence the load module capacitance C1, C2, is increased because of the water absorbed by the hydrogel. Insulating layers can be present on the first and second electrode 101 and 102.

In this exemplary embodiment the load module 103 is sandwiched between dielectric material 1103 on the load module terminals 1101, 1102 having a higher permittivity than the permittivity of the matrix material 104.

The system 100 according to embodiments of the present invention can be used in several types of products. Below 3 types are mentioned; however, application of the system 100 is not limited thereto.

A first type is the wall-type and wall-applied emission surface type product (as applied 'in-house' on existing wall structures).

A second type is the illuminated self-adhesive wall sticker. This product has great added functionality to the decorative, home-styling products that exist today. In this case the first and second electrodes 101, 102 are replaced by conductive patterned flexible plastic films, one of them carrying a pressure sensitive adhesive layer that sticks to a substrate such as a wall, a window or a piece of furniture. The LEDs can be applied between these foils by any type of wet processing in accordance with embodiments of the present invention, e.g. by a coating or by a laminating technology. It is an advantage that the self-adhesive sticker of this type is flexible, hence suitable for covering even and uneven substrates.

A third type of products are free form, odd-shaped luminaries, fabricated starting from a pre-shaped electrode.

In a second aspect, embodiments of the present invention relate to a method for manufacturing a system for receiving electrical power wirelessly, e.g. capacitively. The method comprises:

A first step 1301 of providing a first electrode 101;

A second step 1302 of applying on the first electrode 101 a matrix 104 in wet form wherein at least one load module 103 is embedded in the matrix; and A third step 1302 of applying on the matrix 104 a second electrode 102.

The first electrode 101, the matrix 104 with the embedded at least one load module 103 and the second electrode 102 form a capacitor stack.

In a first embodiment of the current invention the first step 1301 comprises providing a bottom conducting layer (i.e. a first electrode 101), e.g. a layer of dispersed metallic leafing flakes like for example Ag in leitsilber, in wet form on top of a carrier substrate 108. Suitable methods may be coating, spraying, brushing, rolling, dipping. The carrier substrate 108 is the feature (e.g. a wall or a bottom plate/shape for a luminaire) to be covered by the system 100 to be manufactured. Reference is made to FIG. 4 and the corresponding description, which schematically illustrates such system 100 with the first electrode 101 prepared according to this embodiment of the first step 1301. In another embodiment of the present invention the first step 1301 comprises applying an electrode, for instance a transparent electrode such as an ITO layer, on a transparent substrate, for instance a transparent foil. An embodiment with the first electrode 101 prepared according to this method step 1301 is illustrated in FIG. 13.

In embodiments of the present invention, the second step 1302 comprises forming a layer of load modules 103 in a matrix 104. These load modules 103 may be LED packages. In particular embodiments the LED packages may consist of 2 LED dies, in a parallel-anti-parallel configuration. In embodiments of the current invention the form factor of the realized matrix 104 is flat. The thickness of the device could be a few micrometers, while the length and width dimensions are in the order of a few millimeters. The modules 103, e.g. LEDs, can be dispersed in a transparent or translucent polymer matrix 104 (acrylic, epoxy, polyurethane, silicone) such that the modules do not settle out and the viscosity is suitable for wet processing technology, e.g. coating technology. Coating or painting of the LEDs can be done by application technologies like brushing, rolling, stencil printing, blading. Accurate positioning of the load modules 103, e.g. LED packages, is not required, both in location and in orientation. Due to their flat form factor, the load modules 103 will always fall down such that one of their electrodes lies in the plane of the substrate to be covered. This is sufficient for wirelessly powering the device.

In another embodiment of the present invention the second step 1302 comprises blade coating the matrix 104 and load modules 103 onto the first electrode 101. This is illustrated in more detail in FIG. 13.

Figure 13:
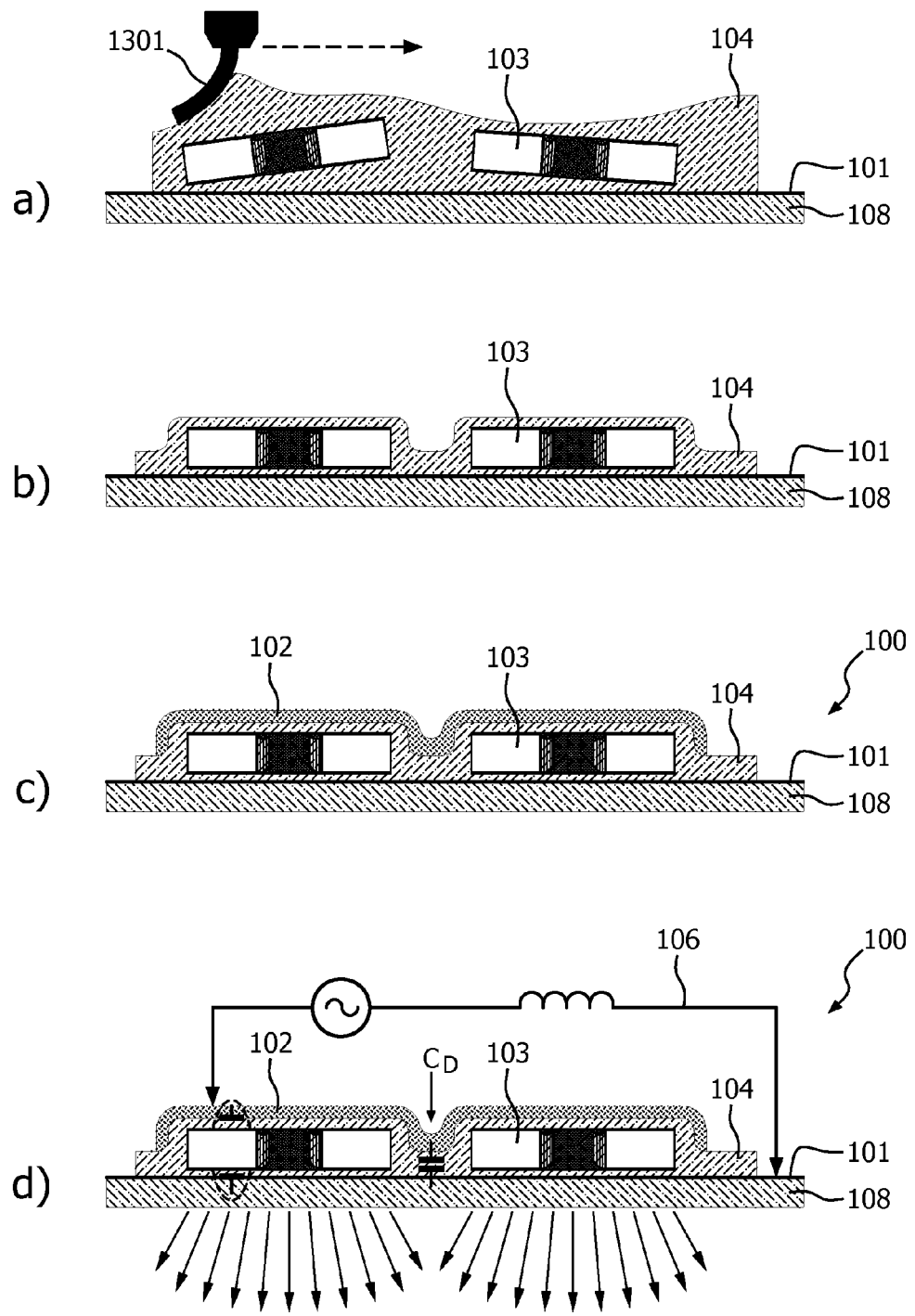
FIG. 13 schematically illustrates subsequent process steps in a method according to embodiments of the present invention.

In a first substep of the second step 1302 implemented as a blade coating process, illustrated as part (a) of FIG. 13, wet matrix material 104 with modules 103 dispersed therein is applied onto the first electrode 101, e.g. an ITO layer, on the carrier substrate 108. In blade coating, an excess amount of matrix material embedding load modules 103 is applied to the underlying substrate. A metering blade 1301 is then moved at a predetermined height over the applied matrix material, thus removing excess material and providing a neatly defined layer of applied material. By moving the metering blade 1301 over the surface, the dispersed load modules 103 are pushed down, close to but not necessarily touching the first electrode 101. Thereafter, the matrix material 104 is allowed to dry. Possibly, in order to obtain this drying, a heating step may be applied by activation of a heater. The result is a structure as illustrated in substep (b) of FIG. 13. In a next step 1303, corresponding to part (c) of FIG. 13, second electrode material 102 is applied onto the dried matrix 104. Preferably the second electrode material 102 is also applied in wet form, e.g. by painting, spraying, coating, brushing, . . . so as to easily allow it to follow the underlying surface topology. The applied second electrode material may be any suitable conductive material, for instance reflecting conductive material, such a for instance silver paint. A system 100 in accordance with embodiments of the present invention is thus obtained. This system can be connected to a drive circuit 106, as illustrated in part (d) of FIG. 13. One pole of the drive circuit 106 is electrically coupled to the first electrode 101, and another pole of the drive circuit 106 is electrically coupled to the second electrode 102.

When driven, the load modules 103 of the system 100 being LED modules, light is generated, which is sent to the ambient through the transparent matrix 104, through the transparent first electrode 101 and through the carrier substrate 108.

In the above-illustrated embodiment, the first electrode 101 is a transparent electrode and the second electrode 102 is a reflective electrode. In embodiments of the present invention, either the first step 1301 or the third step 1303 may comprise applying a transparent electrode. The method may comprise applying an at least partially transparent electrode. In embodiments of the present invention a fully transparent layer may be applied, for instance a layer comprising or consisting of ITO, or a similar layer. In large systems 100, however, the sheet resistance Rsheet of an ITO layer might be too large. In such cases metallic mesh-type layers or layers with embedded conductive fibres or particles like nano silver, might be applied. An exemplary embodiment of a system 100 realized by such a second step 1302 is also illustrated in FIG. 4.

In an exemplary embodiment of the current invention, in steps 1301 and 1303 the first and second electrodes 101 and 102 are provided in a patterned structure.

In another exemplary embodiment of the current invention, after applying the second electrode 102, in step 1303 additionally electrode material in between the load modules may be removed, in order to decrease parasitic capacitance between the first and second electrodes 101, 102 at locations where not load modules 103 are present. Several techniques are possible like etching, drilling holes.

In an exemplary embodiment of the current invention, the method includes increasing the thickness d3 of the matrix 104 to reduce the parasitic capacitor C3. In one embodiment, step 1302 may therefore comprise applying a modification of the wetting properties of the load modules 103 (before applying the wet matrix 104) to allow an easy manufacturing of a dielectric layer (matrix 104) with varying thickness. A thick layer between the LED modules (giving a low C3) and a zero-thickness layer directly on the LED module electrode can thus be made in one step (self-aligning).

According to embodiments of the current invention a capacitive powered electronic structure is built in several steps:

In step 1301 the first electrode is made
In step 1302
the electrodes on both sides of the load modules 103 (possibly LED modules) are coated with a thin dielectric layer before placing them on the first electrode 101
the load modules 103 are placed on the first electrode 101
the area between the load modules 103 is filled with a liquid, optionally transparent, dielectric material which is cured to a solid material after application. This is the matrix 104. In embodiments of the present invention this cured material provides optical characteristics, such as e.g. guiding of light, the spreading of light, improving homogeneity of light, conversion of light.

In step 1303 the second electrode is applied. In this application, according to an embodiment of the present invention, a reflecting material such as silver may be used. Silver can be deposited with a vacuum deposition process, from dispersion with particles (e.g. silver paint) or deposited with a wet-chemical electroless process (such as used in mirror production).

In another exemplary embodiment of the current invention, step 1302 comprises placing load modules 103 embedded in a layer or envelope of higher permittivity material than the dielectric material used in step 1302 for filling the area between the load modules 103 for forming the matrix 104. Such a structure is illustrated in FIG. 9.

In another exemplary embodiment of the current invention, step 1302 comprises placing load modules 103 with on the sides facing the first and second electrode 101 and 102, an electrode and on top of the electrode a material with higher permittivity material than the dielectric material used in step 1302 for filling the area between the load modules for forming the matrix 104. This allows enhancing the wanted coupling capacitors (the load module capacitances) without additional parasitic capacitance.

The invention claimed is:

1. A system for receiving electrical power wirelessly, the system comprising:
a first electrode and a second electrode,
at least one load module in a matrix sandwiched between the first and second electrodes; the first electrode, the load module in the matrix, and the second electrode forming a capacitor stack,
wherein at least the matrix is applied in wet form and wherein the distance between the first and second electrodes in areas where no load module sandwiched between the two electrodes is larger than in areas where a load module is sandwiched therebetween.

2. A system according to claim 1, wherein the at least one load module comprises a light emitting diode.

3. A system according to claim 1, wherein one of the first and second electrodes is reflective and the other one of the first and the second electrodes is transparent or optically active.

4. A system according to claim 1, wherein the matrix is a transparent or translucent polymer matrix.

5. A system according to claim 1, comprising a connector for connecting the first electrode and the second electrode to a drive circuit.

6. A system according to claim 1, wherein the system lacks conductive material in the first and second electrodes in areas were no load module is sandwiched between the two electrodes.

7. A system according to claim 1, the first electrode and the second electrode each comprising one or more conductive strips, wherein the conductive strip(s) of the first electrode are differently oriented than the conductive strip(s) in the second electrode so as to form a patterned structure with at least one overlapping region between first and second electrodes, such that the at least one load module located at the at least one overlapping region of the first and second electrodes.

8. A system according to claim 1, wherein the at least one load module has a hydrophobic coating on at least one side facing at least one of the first or second electrodes.

9. Use of a system according to claim 1 in a wall-type application, in a sticker-type application or in a free form luminaire product.

10. A method for manufacturing a system for receiving electrical power wirelessly, the method comprising:
providing a first electrode,
applying on the first electrode a matrix in wet form wherein at least one load module is embedded in the matrix thereby providing at least one load module having a hydrophobic coating on at least one side, such that when applying the wet matrix it is repelled from the at least one load modules at at least one side,
applying on the matrix a second electrode,
such that the first electrode, the at least one load module embedded in the matrix, and the second electrode form a capacitor stack.

11. A method according to claim 10, wherein the matrix is applied through painting, brushing, spraying or rolling.

12. A method according to claim 10, furthermore comprising, after applying the second electrode, removing conductive material from the first and second electrodes in areas where no load module is sandwiched between the two electrodes.

13. A method according to claim 10, wherein providing the first electrode comprises applying first conductive strips on a substrate, and wherein applying the second electrode comprises applying second conductive strips which are differently oriented compared to the first conductive strips of the first electrode so as to form a patterned structure with at least one overlapping region between first and second electrodes, applying second conductive strips of the second electrode being such that the at least one load module is positioned at an overlapping region of the first and second conductive strips.

\* \* \* \* \*